Sept. 4, 1934. S. ESTRADA ET AL 1,972,649
APPARATUS FOR EXTRACTING JUICE FROM SKINLESS FRUITS
Original Filed July 6, 1933
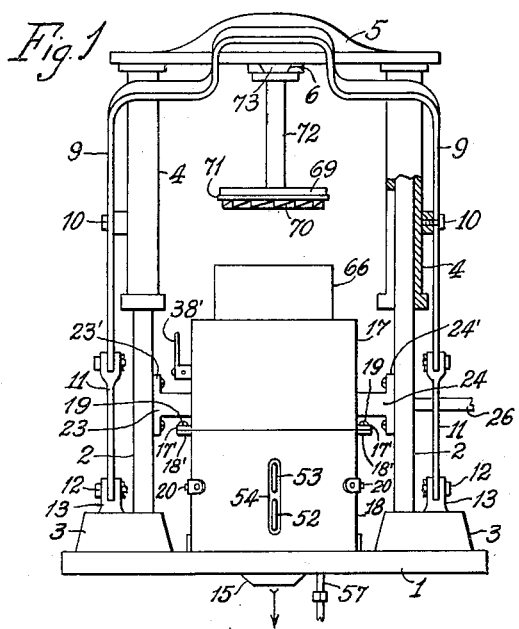
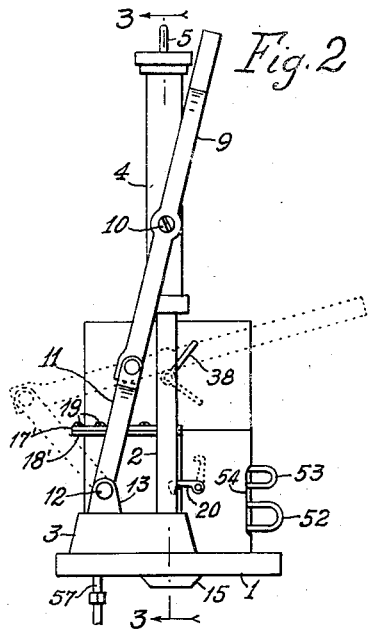
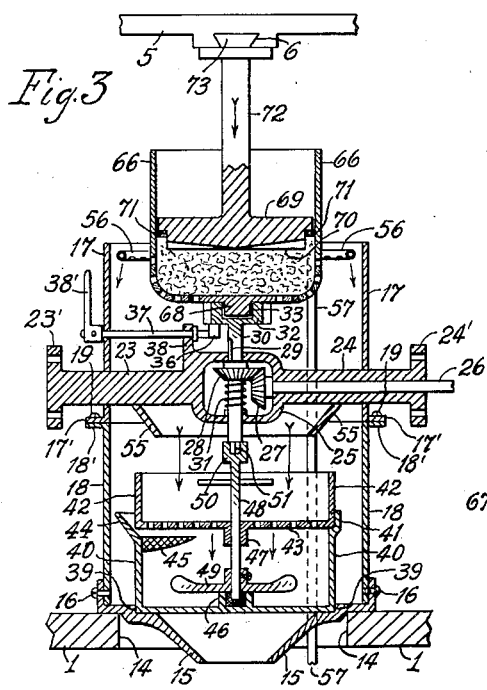
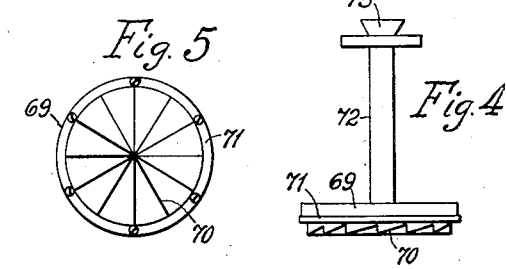
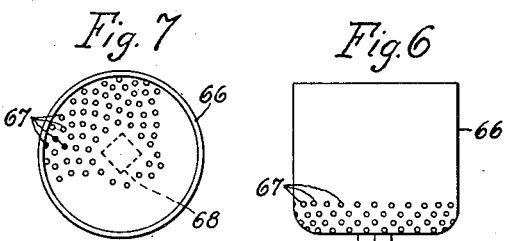

Patented Sept. 4, 1934

1,972,649

UNITED STATES PATENT OFFICE 1,972,649

APPARATUS FOR EXTRACTING JUICE FROM SKINLESS FRUITS

Santiago Estrada, Enrique Mauri, and Armando Ivey, Habana, Cuba

Original application July 6, 1933, Serial No. 679,250. Divided and this application February 12, 1934, Serial No. 710,918. In Cuba May 18, 1933

2 Claims. (Cl. 146—3)

This application is a division of an application Ser. No. 679,250 filed July 6, 1933, for Apparatus for extracting fruit juice, and it has for its object to provide an apparatus for the extraction of the juice from skinless fruits, and in which the fruit to be squeezed is subjected at the same time to a compression and to a rotatory grating action which completely reduces the fruit to pulp, thus facilitating the whole extraction of the juice contained in the fruit, this apparatus being so constructed and arranged that it can be handled by any person without fear for complications of any sort.

This invention is described with reference to the figures of the annexed drawing, of which:

Fig. 1 is a front elevation view of the apparatus in its inoperative position.

Fig. 2 is a side elevation view of the apparatus in the same position.

Fig. 3 is a vertical section of the apparatus on line 3—3 of Fig. 2, showing the whole inner structure of the same, in its operative position.

Fig. 4 is a detail view showing in outer side elevation the compressing and grating disc which is employed for squeezing skinless fruits.

Fig. 5 is a lower plan view of the grating and compressing disc.

Fig. 6 is a detail view showing in outer side elevation the rotatory container for squeezing skinless fruits.

Fig. 7 is an upper plan view of the container.

This apparatus is composed of a base 1 upon which are two standards 2 spaced from each other and reinforced at their base by foundations 3. This base has suitable holes for fixing it by means of bolts upon a suitable counter, table or furniture. Slidably mounted on the standards 2 is a vertical frame open at its bottom and whose sides 4 are hollow columns guided upon the standards 2, and the top 5 of the slidable frame shows at the middle of its lower face a transversal head forming a guide of swallow-tail section 6 for the head of similar section 73 of a stem 72 ending in a grating disc 69 which is provided with radial teeth 70 on its lower face and a fibre washer 71 is provided thereon with the purpose thereafter stated.

The grating disc 69 receives together with the slidable frame 4, 5, an alternative motion which is caused by manually operating a handle formed at the top of an inverted U-shaped swing bar 9 pivotally mounted at intermediate points of its branches on horizontal pivots 10 fixed to the hollow columns 4, the branches being pivotally connected at their lower ends to connecting bars 11 which are also connected at their lower ends to horizontal pivots 12 supported on brackets 13 fixed to the foundations 3. In Fig. 2 are respectively shown in full lines and dotted lines the upper and lowest positions of the swing-bar 9 and of the connecting bars 11 corresponding to the upper and lowest positions of the grating and compressing disc 69.

The base 1 shows vertically beneath the slidable frame 4, 5, a circular opening 14 upon which fits a funnel-shaped open base 15 provided with a vertical flange to which is fixed by means of screws 16 the stationary portion of a cylindrical cover horizontally divided into two halves 17 and 18 connected by means of flanges 17' and 18' at their adjacent edges which are secured to each other by means of bolts 19, the other portion of the cylindrical cover one-half 18 being detachable and secured by means of clamps 20 to the stationary portion when the containers for the pulp and extracted juice are enclosed in the cover.

The upper half 17 of the cylindrical cover is integral with two brackets one solid 23 and another hollow 24 in horizontal alignment, which are connected at the center by a casing 25 designed to contain a suitable draw-gear. The brackets 23 and 24 project beyond the cylindrical cover 17 and there are provided with vertical flanges 23' and 24' which serve to fix them by means of screws to the standards 2 through a suitable slot in the respective column 4. Within the hollow bracket 24 is rotatorily mounted a horizontal shaft 26 provided within the casing 25 with a bevelled pinion 27 meshing with another bevelled pinion 28 slidably carried by means of a wedge 29 on a vertical shaft 30 rotatorily mounted in journal bearings formed at the upper and lower portions of the casing 25 so that the shaft 30 can slide under the pinion 28 without this pinion 28 failing to mesh with the pinion 27, as the former is pressed upwardly by a coil spring 31 rolled upon the vertical shaft 30 within the casing 25.

The shaft 30 carries at its upper end a head 32 forming a square socket 33 for insertion therein of the square head 68 provided at the lower end of a cylindrical container 66 (Figs. 6 and 7) provided with perforations 67 in its side periphery and bottom, within which container the fruit to be squeezed is placed. This action is made by the grating disc 69 upon bringing down on the fruit placed in the container 66, to which end the grating disc 69 is provided with radial teeth 70 on its lower face and a fibre washer 71 is provided thereon to soften the rotating action of the container 66 on the grating disc 69.

The shaft 30 may be lifted or let down by means of a cam 36 fixed at the end of a horizontal shaft 37 rotatorily mounted on a bracket 38 integrally formed at the top of the casing 25 and through an opening formed in the cylindrical cover 17, said shaft 37 ending outside this cover in a handle 38 for its operation, as shown in Fig. 7 of the drawing. The bottom of the head 32 rests on the cam 36 and when the latter is rotated along with the shaft 37, it causes the head 32 to lift and with the same is lifted the slidable shaft 30 for the purpose explained thereafter. The shaft 26 is coupled to any power producing means as the shaft of an electric motor or to a shaft manually operated by a handle.

On a recess 39 formed in the funnel-shaped base 15 is mounted a cylindrical container 40 open at its top and which forms at its upper edge a seat with a flange 41 adapted to receive a second cylindrical container 42 open at its top, the perforated bottom 43 of which properly forms a strainer, the lower container 40 having a slanting mouth 44 at its front to discharge the strained and stirred juice, and adjacent to said mouth is placed a straining plate in the shape of a segment 45, so that upon inclining the containers the juice coming out through the mouth 44 may be strained again.

On bushings 46 and 47 formed on the bottom of both containers 40 and 42 is rotatorily mounted a vertical shaft 48 which is provided with a blade-stirrer 49 within the lower container 40 and said shaft 48 has at its upper end a square-hollow head 50 adapted to couple with another solid square head 51 formed at the lower end of the shaft 30 with which is in vertical alignment said vertical shaft 48, when said shaft 30 is let down by the cam 36. The containers 40 and 42 are respectively provided with handles 52 and 53 positioned at the front of the apparatus and which project outside the detachable half of the cover 18 through a slot 54. The juice dropping from the grated and compressed fruit is guided to the upper container 42 through a guiding funnel 55 integrally formed with the horizontal brackets 23 and 24.

For cleaning and washing the apparatus, an annular tube provided with lower perforations 56 is arranged in the upper part of the cover 17 and inside thereof, which is in communication through a tube 57 with a water-pipe.

The operation of the apparatus is as follows: a skinless pineapple for instance, is taken and cut horizontally in two halves, and one half 58 is placed in the container 66. Then the horizontal shaft 26 is put into operation by means of any power supplying means, and upon said shaft 26 rotating, its action is transmitted to the vertical shaft 30 by means of the bevelled pinions 27, 28, whereupon the container 66 will rotate. Immediately the grating disc 69 is caused to descend by grasping with the hand the handle 9 and causing the swing-bar 9 to rotate on its horizontal pivots 10, whereupon the hollow columns 4 will slide down upon the standards 2 until the grating disc 66 is introduced in the container 66 and may rest upon the fruit 58 placed therein. As the container 66 carrying the fruit 58 rotates on its shaft 30, the fruit 58 is grated by the teeth 70 at the same time that it is compressed by the disc 69 through the downward pressure of the operator's hand, and the fruit juice and pulp are recollected in the upper container 42 through the guiding funnel 55. The juice strains by gravity through the perforations of bottom 43 of upper container 42 and is received in the second container 40 where it is stirred by the blade-stirrer 49. When it is desired to utilize the juice, the detachable half 18 of the cylindrical cover is removed, and by means of the handle 38 the cam 36 is caused to rotate and raise the head 32 of the shaft 30 to disconnect this shaft 30 from the lower shaft 48, whereupon the two containers 42 and 40 can be drawn out.

Within the lower container 40 crushed ice and sugar may be added to the juice, in order to serve it directly to the consumer, once stirred.

This apparatus has great sanitary conditions, as the operative parts thereof are entirely covered whereby the direct contact of the operator's hand with the fruit while the juice of same is extracted, is avoided.

What we claim is:

1. An apparatus for extracting juice from skinless fruits, which comprises a stationary supporting frame, a vertical shaft rotatorily mounted on said supporting frame, a container open at its top and having its bottom provided with perforations which is rotatorily and detachably mounted at the upper end of said shaft, a pair of standards fixed outside the stationary supporting frame, a slidable frame formed by two hollow columns connected to each other at its top and each mounted upon each of said standards, a grating disc mounted on the top of said slidable frame to cooperate with the rotatory container to compress the fruit contained in the container and to reduce it to pulp as it is compressed, a receiving container for the pulp and juice which is placed beneath the supporting frame, means for rotating the vertical shaft carrying the container, and means for vertically reciprocating the slidable frame upon the standards.

2. An apparatus for extracting juice from skinless fruits, which comprises a supporting cover, brackets connected to said cover in horizontal alignment and connected to each other by a casing, a horizontal shaft rotatorily mounted on one of said brackets, a vertical shaft rotatorily and slidably mounted through said casing, bevelled gears within said casing to rotatorily connect both horizontal and vertical shafts, a cylindrical container open at its top and detachably mounted on the upper end of the vertical shaft, a pair of standards fixed outside the cover, a slidable frame formed by two hollow columns connected to each other at its top and each mounted upon each of said standards, a grating disc mounted at the center of the top of said slidable frame to cooperate with the rotatory container to compress the fruit contained in the container and at the same time to grate it as it is compressed, a receiving container for the pulp and a receiving container for the juice both placed beneath the rotating mechanism and enclosed in the supporting cover, the former container being superposed to the latter container, the former having its bottom perforated to strain the juice, and the latter having a blade-stirrer whose vertical shaft projects beyond the former container and has at its upper end a head adapted to engage another head formed at the lower end of the vertical shaft carrying the rotatory container for the fruit, means for rotating said horizontal shaft from any power supplying means, means manually operated for vertically reciprocating the slidable frame upon the fixed standards, and means for guiding the pulp and juice dropping from the rotatory container to the strainer placed below the rotating mechanism.

SANTIAGO ESTRADA.
ENRIQUE MAURI.
ARMANDO IVEY.